United States Patent [19]
Koenig

[11] Patent Number: 6,003,028
[45] Date of Patent: Dec. 14, 1999

[54] IMPLEMENTING EXTENDED NUMERIC RANGE WITHIN A TWO-DIGIT SOFTWARE REPRESENTATION

[75] Inventor: Thomas M. Koenig, Monona, Wis.

[73] Assignee: Dyxlar North America, Inc., New York, N.Y.

[21] Appl. No.: 09/006,350

[22] Filed: Jan. 13, 1998

Related U.S. Application Data

[60] Provisional application No. 60/068,154, Dec. 16, 1997.

[51] Int. Cl.$^6$ .................................................. G06F 17/30
[52] U.S. Cl. .............................. 707/6; 707/102; 707/101
[58] Field of Search ................................ 707/6, 102, 101

[56] References Cited

U.S. PATENT DOCUMENTS

| | | |
|---|---|---|
| 3,995,450 | 12/1976 | Rozett . |
| 4,044,347 | 8/1977 | Voorhis . |
| 4,752,765 | 6/1988 | Larson . |
| 5,630,118 | 5/1997 | Shaughnessy ................ 707/1 |
| 5,644,762 | 7/1997 | Soeder . |
| 5,668,989 | 9/1997 | Mao ........................ 707/101 |
| 5,719,826 | 2/1998 | Lips ......................... 368/29 |
| 5,737,735 | 4/1998 | Soeder ....................... 707/6 |
| 5,758,336 | 5/1998 | Brady ........................ 707/6 |
| 5,758,346 | 5/1998 | Baird ...................... 707/101 |
| 5,761,668 | 6/1998 | Adamchick .............. 707/101 |
| 5,765,145 | 6/1998 | Marsiello .................. 707/1 |
| 5,794,048 | 8/1998 | Brady ........................ 707/6 |
| 5,797,117 | 8/1998 | Gregovich ............... 707/101 |
| 5,806,063 | 9/1998 | Dickens ..................... 707/6 |
| 5,806,067 | 9/1998 | Coner ..................... 707/100 |
| 5,808,889 | 9/1998 | Burgess ................... 364/737 |
| 5,809,500 | 9/1998 | Nolan ......................... 707/6 |

OTHER PUBLICATIONS

Hart et al., "A Scaleable, Automated Process for Year 2000 System Correction", PROC 18th Int'l Conference on Software Enginerring, Mar. 25–30, 1996, pp. 475–484.

*Primary Examiner*—Wayne Amsbury
*Attorney, Agent, or Firm*—Friedman Siegelbaum LLP

[57] ABSTRACT

A process for extending the cognizable range of two-digit fixed-point number fields by encoding and decoding within existing size constraints of such fields in records and database segments stored with ASCII, EBCDIC and/or packed decimal representations in digital data processing systems, particularly adapted to application and database management software in mature in large mainframe computer installations. Numeric values provided by a human or automated source are evaluated to ascertain whether they fit within the range previously established for such fields and, if within the range, left undisturbed; otherwise they are encoded or decoded by a method which is transparent to existing software utilizing the records or segments, and which will be indexed and presented to existing software in the logically anticipated ascending or descending numeric sequence notwithstanding that the previously defined range of said fields, preferably utilized to render older software Year-2000 cognizant without reprogramming or rewriting old segments or records, or historic or backup copies thereof.

22 Claims, 7 Drawing Sheets

| DATE FORMAT | DISPLAY FORMAT | CENTURY | DECIMAL VALUE | HEX VALUE | BINARY VALUE | NUMBER OF BYTES |
|---|---|---|---|---|---|---|
| ASCII - JULIAN | YYDDD | 19 | 99365 | 3939333635 | 00110011 00111001 00110011 00110110 00110101 | 5 |
| ASCII - GREGORIAN | YYMMDD | 19 | 991231 | 393931323331 | 00110011 00111001 00110001 00110010 00110011 00110001 | 6 |
| EBCDIC - JULIAN | YYDDD | 19 | 99365 | F9F9F3F6F5 | 11111001 11111001 11110011 11110110 11110101 | 5 |
| EBCDIC - JULIAN 9's COMPLEMENT | YYDDD | 19 | 00634 | F0F0F6F3F4 | 11110000 11110000 11110110 11110011 11110100 | 5 |
| EBCDIC - GREGORIAN | YYMMDD | 19 | 991231 | F9F9F1F2F3F1 | 11111001 11111001 11111000 11110010 11110011 11110001 | 6 |
| EBCDIC - GREGORIAN 9's COMPLEMENT | YYMMDD | 19 | 008768 | F0F0F8F7F6F8 | 11110000 11110000 11111000 11110111 11110110 11111000 | 6 |
| EBCDIC - PACKED - JULIAN | YYDDD | 19 | 99365 | 99365C | 10011001 00110110 01011100 | 3 |
| EBCDIC - PACKED - GREGORIAN | YYMMDD | 19 | 991231 | 0991231C | 00001001 10010001 00100011 00011100 | 4 |

FIG. 5A

| DATE FORMAT | DISPLAY FORMAT | CENTURY | DECIMAL VALUE | HEX VALUE | BINARY VALUE | NUMBER OF BYTES |
|---|---|---|---|---|---|---|
| ASCII - JULIAN | YYDDD | 20 | 9_365 | 393A333635 | 00110011 00111010 00110011 00110110 00110101 | 5 |
| ASCII - GREGORIAN | YYMMDD | 20 | 9_1231 | 393A31323331 | 00110011 00111010 00110001 00110010 00110011 00110001 | 6 |
| EBCDIC - JULIAN | YYDDD | 20 | 9_365 | F9FAF3F6F5 | 11111001 11111010 11110011 11110110 11110101 | 5 |
| EBCDIC - JULIAN 9's COMPLEMENT | YYDDD | 20 | -99634 | E9F9F6F3F4 | 11101001 11111001 11110110 11110011 11110100 | 5 |
| EBCDIC - GREGORIAN | YYMMDD | 20 | 9_1231 | F9FAF1F2F3F1 | 11111001 11111010 11110001 11110010 11110011 11110001 | 6 |
| EBCDIC - GREGORIAN 9's COMPLEMENT | YYMMDD | 20 | _98768 | E9F9F8F7F6F8 | 11101001 11111001 11111000 11110111 11110110 11111000 | 6 |
| EBCDIC PACKED - JULIAN | YYDDD | 20 | 9_365 | 9A365C | 10011010 00110110 01011100 | 3 |
| EBCDIC PACKED - GREGORIAN | YYMMDD | 20 | 9_1231 | 09A1231C | 00001010 10010001 00100011 00011100 | 4 |

FIG. 5B

| DATE FORMAT | DISPLAY FORMAT | CENTURY | DECIMAL VALUE | HEX VALUE | BINARY VALUE | NUMBER OF BYTES |
|---|---|---|---|---|---|---|
| ASCII - JULIAN | YYDDD | 18 | _9365 | 2939333635 | 00100011 00111001 00110011 00110011 00110101 | 5 |
| ASCII - GREGORIAN | YYMMDD | 18 | _91231 | 293931323331 | 00100011 00111001 00110001 00110010 00110011 00110001 | 6 |
| EBCDIC - JULIAN | YYDDD | 18 | _9365 | E9F3F6F5 | 11101001 11111001 11110011 11110110 11110101 | 5 |
| EBCDIC - GREGORIAN | YYMMDD | 18 | _91231 | E9F9F1F2F3F1 | 11101001 11111001 11110001 11110010 11110011 11110001 | 6 |
| EBCDIC PACKED - JULIAN | YYDDD | 18 | 99365 | 9A365D | 10011001 00110110 01011101 | 3 |
| EBCDIC PACKED - GREGORIAN | YYMMDD | 18 | 991231 | 0991231D | 00001001 10010001 00100011 00011101 | 4 |

FIG. 5C

# IMPLEMENTING EXTENDED NUMERIC RANGE WITHIN A TWO-DIGIT SOFTWARE REPRESENTATION

CROSS-REFERENCE TO RELATED APPLICATION

This is a non-provisional application pursuant to a provisional application under the provisional title "Process for Implementing Four-Digit Year Field in a Two-Digit Field" and assigned Ser. No. 60/068,154, entitled a "Process for Implementing Four-Digit Year Field in a Two-Digit Field," filed on Dec. 16, 1997.

FIELD OF THE INVENTION

The invention relates to the field of computer software programming and database management and to a method of extending the numeric range of a two-digit field without disturbing existing programs or data, preferably as a method for implementing a solution to the so-called Year 2000 problem of the missing two digits denoting the century.

DEFINITIONS

Alphanumeric Integer Representations

Fixed-point numbers (i.e., integers) are represented by one byte or two nibbles or 8 bits in ASCII or EBCDIC.

ASCII (American Standard Code for Information Interchange)

ASCII representation of numbers are pervasive in the personal computer and non-IBM mainframe world. A zero or "0" is represented as $3_{16}$ (base 16 hexadecimal) or 00110000$_2$ (base 2 binary). The first nibble is always X'3' (alternate software definition of hexadecimal value) or B'0011' (alternate representation of binary). The second nibble are represented as shown in "Nibble Values" below. So the numbers "0" through 9 are represented in ASCII in the form of: 0=B'0011 0000', 1=B'0011 0001', 2=B'0011 0010', 3=B'0011 0011', 4=B'0011 0100', 5=B'0011 0101', 6=B'0011 0110', 7=B'0011 0111', 8=B'0011 1000', 9=B'0011 1001'.

Bit

A binary value of one or zero

Byte

A cell consisting of two consecutive nibbles, or 8 bits, representing values from zero to 255; generally, the smallest addressable segment of memory.

Complement Arithmetic ("9's Complement")

A common software practice of subtracting a date from a larger numeric value for date in key or index fields in order to reverse the sort order for most-recent-first sequential presentation.

EBCDIC (Extended Binary Coded Decimal Information Code)

EBCDIC representation is utilized throughout the vast installed base of large IBM mainframe databases. Fixed-point numbers are represented by the maximum hexadecimal value in the first nibble X'F' or B'1111'. The second nibble is represented as in ASCII (see Nibble Values, below). So the numbers "0" through 9 are represented in EBCDIC in the form of: 0=B'1111 0000', 1=B'1111 0001', 2=B'1111 0010', 3=B'1111 0011', 4=B'1111 0100', 5=B'1111 0101', 6=B'1111 0110', 7=B'1111 0111', 8=B'1111 1000', 9=B'1111 1001'.

Encode/Decode

The process of rendering a two-digit representation into the format of the present invention/recognition of said format and returning a value cognizable to, and in the anticipated sequence of, the original.

Gregorian Dates

A common software practice of representing a Gregorian date on a computer storage device in the form of YYMMDD where "YY" is the two digit year, "MM" is the month of the year and "DD" is the number of day in the month (e.g., Dec. 31, 1998=981231; Jan. 1, 1999=990101)

Julian Dates

A common software practice of representing a Julian date on a computer storage device in the form of YYDDD where "YY" is the two digit year and "DDD" is the sequence number of the day in the year (e.g., Dec. 31, 1998=98365; Jan. 1, 1999=99001)

Nibble (sometimes, "Nybble")

A collection of four consecutive bits representing a range of values from zero to fifteen; a term developed to represent half a "byte."

Nibble Integer Values

The second (low-order) nibble in either ASCII or EBCDIC is used to represent the integer numbers "0" through "9" with the following binary values: 0=B'0000', 1=B'0001', 2=B'0010', 3=B'0011', 4=B'0100', 5=B'0101', 6=B'0110', 7=B'0111', 8=B'1000', 9=B'1001'; the six remaining binary values from B'1010' through B'1111' are not used for integer representation.

Packed Decimal ("COMP-3") Numbers

In packed decimal (or "packed numbers" or simply "packed"; also COMP-3 after the COBOL language designation for integers of this format), in which fixed-point numbers are represented by one nibble or 4 bits without the fixed-point prefix of ASCII (X'3') or EBCDIC (X'F'). The nibble values are the same (see Nibble Values, above).

BACKGROUND OF THE INVENTION

Computers have become the lifeblood of modem commerce and are as indispensable today in the management of information as are electric power or telephone service. Few, if indeed any, business or governmental entities are not dependent upon some form of automated information and retrieval system. This reliance has expanded in inverse proportion to the ever-decreasing cost of computer equipment, driven continually downward by the synergistic effects of technological advances, competition and rapid obsolescence. The present explosion of Internet usage testifies to the automated future of global commerce.

There was, however, a mote clouding the vision of the programmers of the Information Revolution, which has now become a plank in the collective eye and imminently threatens to immobilize entire industries. There are a number of cures for this computer cancer, at least in theory, but the certainty of an immutable and rapidly approaching deadline curtails the time available to stem spread of the disease. Indeed, time itself is the problem—or at least, the post-Gregorian method of counting it.

Year 2000 Recognition Problem

The problem, of course, is the Year 2000. The Century Express has left the station, is gathering steam, cannot be stopped and threatens to derail many, if not all the passengers who have hitched a ride to the Information Age. It is at once a paradox of progressiveness and monumental myopia. Computers can crunch many numbers of virtually any length (in either direction or both of a decimal place) by stringing together enough registers. Yet, notwithstanding its inherent mathematical virtuosity, crucial computer systems have been rendered incapable of the elementary-school function of adding 1 to 1999 and accurately rendering the sum of 2000. The cause is equally elementary, the omission of the century digits "1" and "9" from the definition of most record layouts and corresponding processing algorithms, primarily in well established large-scale commercial and governmental mainframe database systems, with the resulting interpretation by software of "00" as the year 1900, not 2000 as intended, with unpredictable, unintended and potentially disastrous results. The following simplified example of a credit card will illustrate how the submission works in practice.

Examine virtually any valid credit card. Its expiration date is almost certain to be restricted to only 11/99 or 12/99. Despite superior creditworthiness of the cardholder, an expiration date of 12/00 or later would be as welcome today as a bounced check in many validation systems because of "date arithmetic." The credit-card validation procedure is relatively straightforward. Omitting consideration of the month (MM) for simplicity, the algorithm might be expressed as follows: Subtract the 2-digit current year (YY) from the 2-digit expiration year; if the result is not negative, VALIDATE; otherwise, DECLINE. Now, consider this algorithm applied to a credit card expiring in 1999 validated in 1998: subtract 98 from 99, leaving 1. One is non-negative, so the purchase is approved. Now, the same process in a different decade—a credit card expiring in 2000: 00 less 98 is (−98). Negative ninety-eight is negative, and the perfectly valid credit card is declined as a result. In more elementary terms, the computer determines that an "exp. 12/00" credit card expired almost 100 years ago.

The explanation for the seemingly obvious omission of century digits from critical software systems, while not required for an understanding of the present invention, is understandable. Only a decade ago, computer memory and disc storage were still relatively expensive, although on their way to more widespread affordability. Personal computers were in their adolescence, if not infancy, but generally lacked the capacity for truly sophisticated applications. In short, information storage was still at a premium cost and, in effect, a byte saved was byte earned. As a consequence, computer programmers acculturated to the month/day/year representation of dates as MM DDYY (or DD/MM/YY outside North America), usually implemented as YYMMDD in software to preserve ascending numeric sequence (collectively referred to as "Gregorian dates"), and felt little urgency to include the "19" in every record because everyone knew that was implied. This consciousness survives today in the myriad preprinted forms bearing "19$_{13}$" where the manual entry of a year is required. The YY consciousness was even more so the case in the 1970's and '80's when the 21$^{st}$ century bore even less relevance to the quarterly-report orientation of the corporate world. The exceptions which arose, the maturity dates of mortgages or municipal bonds, were dealt with on a case-by-case basis and grudgingly granted their requisite two extra integers. Otherwise there was a decided reluctance to expend two extra digits to imply a value of 1900 (or CCYY) which would not vary for years, if not decades, to follow.

This resistance to expending the extra digits for century representation was particularly pronounced where, as is often the case, a date, and consequently the year, comprised part of an index field, causing a corresponding two-place overhead in an often referenced table in addition to every indexed record. On the rare occasions when a systems analysts may have challenged the omission of century digits, the common rationalization was the presupposition that the program at issue would not be running after 1999, the evident assumption being that computer technology would by then exceed present capability and be replaced by that time. But the availability of superior database products have not, as anticipated, supplanted the enormous installed base of older-technology database applications.

Year 2000 compliance is de rigeur for all currently developed database applications and has been for some time. Large non-Year 2000 compliant mainframe systems, particularly database oriented systems such as those developed using the Information Management System ("IMS") or Virtual Sequential Access Method ("VSAM") database managers provided by the International Business Machines Corporation ("IBM"), have proven remarkably durable. Countless staff hours have gone into development of these behemoth databases resulting in applications which have been so debugged, refined and fine-tuned over the years as to lower their relative costs of operation to the minimum. These residual programs and associated databases from the recent past are generally now referred to as "legacy" systems. In contrast to the inherent difficulty in converting to a wholly new application and/or platform—even if Year 2000 compliant—the resulting benefit simply does not outweigh the cost and risk. Hence, the present debacle: a mammoth installed base of mature, interconnected computer systems to which industry would give no thought whatever of tampering were it not for the happenstance of a terminating millennium.

Prior Art Methods to Address Year 2000 non-Compliant Software

Numerous approaches have been developed to implement century-cognizance, especially in existing computer databases. All prior art solutions developed thus far, however, are fraught with difficulties and disconcertingly problematic implementations. These and other attempted solutions exist and are well-known in the prior art. Solutions may be categorized generally into: concatenation/expansion, "windowing" techniques, and various schemes to encode century information and, of course, decode it on retrieval.

Concatenation/Expansion: 2-Digit to 4-Digit

Perhaps the most obvious and intuitive solution is the inclusion of all four digits in the year field, rendering an application theoretically usable for the next 8000 years (with prior-date capability back to the Year 0). The internal format may be represented (where X followed by a value in single quotations represents a hexadecimal representation in EBCDIC, such as X'F9F9' for F9F9$_{16}$) as, for example:

"00" (i.e., 1900) for X'F0F0' to X'F1F9F0F0'

"99" (1999) for X'F9F9' to X'F1F9F9F9'

"00" (2000) also X'F0F0' to X'F2F0F0F0'

Such expansion of a date field to permit concatenation of century digits (CC) to a prior YY format (rendering CCYY) has the significant advantage of working properly in key and index fields. However, for numerous reasons this solution may be the least desirable in that it requires the universal updating of all databases and program source code—some of which may no longer be extant—and the careful repositioning of all displaced adjacent fields in every record. Moreover, this process of updating must be done at the same time to keep the databases and programs which use them in 'sync.' Rarely accessed but important historic and/or backup data would also have to be converted to the new format in order to remain comprehensible to software revised to be cognizant of Year-2000. Furthermore, this solution also consumes additional character-storage space in mature systems which may not have much space to spare.

Fixed or Sliding Windowing Techniques

Another solution in the prior art is the "windowing technique," or the superimposition of an arbitrary "window" defining certain years as automatically implying the 1900's (e.g., 50–99) and the remainder implying the 2000's (i.e., 00–49):

"50" (1950) or X'F5F0' remains X'F5F0'

"99" (1999) or X'F9F9' remains X'F9F9'

"00" (2000) or X'F0F0' remains X'F0F0'

"49" (2049) or X'F4F9' remains X'F4F9'

With windowing, the internal value does not change; the interpretation of that value, whether $20^{th}$ or $21^{st}$ century, changes. The window may be "fixed" or "sliding." In the preceding example, a fixed window would always interpret "50" (X'F5F0') as 1950, "49" (X'F4F9') as 2049. In a sliding window solution, the interpretation would change over time, typically incrementing annually. Therefore, were the previous example to have been implemented in the year 1999, a sliding window may have the minimum and maximum year increment when the values are interpreted during 2000:

"51" (1951) or X'F5F0' remains X'F5F0'

"99" (1999) or X'F9F9' remains X'F9F9'

"00" (2000) or X'F0F0' remains X'F0F0'

"50" (2050) or X'F5F0' remains X'F5F0'

The technique would be the same for non-EBCDIC (e.g., ASCII) data representational formats as the internal values are never altered, just their interpretation.

Windowing has the advantages of simplicity and conformity with existing YY year formats.

Windowing can be effective in applications wherein the range of years is not extensive, as this technique rigidly restricts the application to a universe of 100 years, regardless of century. Therefore, windowing has the disadvantage of not being useful in many business applications because of the 100-year limitation, life insurance being perhaps the most readily identifiable example.

The most significant drawback to either fixed or sliding windowing is that the technique does not work with key fields and indices, rendering it problematic in database applications. As with all Year 2000 solutions in the prior art, windowing requires that all interpreting software be reprogrammed to recognize whatever arbitrary "fixed" or "sliding" window of years has been assigned. Moreover, in the case of a sliding window, source programs may have to be repeatedly revised to accommodate the changing interpretation of the current window in effect. Moreover, a sliding window could be problematic whenever historic (or backup) records may have to be accessed, because the century interpretation of the YY fields may have altered, requiring a further level of complexity to properly interpret these data. Another disadvantage of windowing is that prior century recognition (i.e., late 19th century dates), still relevant in some applications, may have to be sacrificed.

The most significant disadvantage of windowing for database applications, however, is the loss of sequencing because of the missing two century digits. Much if not most existing software performing sequential database retrievals of date-keyed information understandably expect that higher numbered years will follow lower numbered years; e.g., "96" will be followed by "97", "97" by "98", and so forth seriatim. Windowing techniques are utilized to superimpose an interpretation of 2000 and 2001 on a YY field containing "00" and "01" instead of 1900 and 1901, respectively. Nevertheless, the sequential presentation of year data (where the year is the key or index or part thereof) remains the same: "00", "01", "02", and so forth through "97", "98" and "99", whereupon the sequence ends. Using windowing, when these data are accessed sequentially, the years are not retrieved from the database in the desired logical order of "97", "98", "99", "00", "01", "02", etc., which would be the order of presentation if the same year field contained the two century digits ("1997", "1998", "1999", "2000", "2001", "2002", etc.). With the century digits, these years would be retrieved from the database in this order as an incidental matter of these years' comparative numerical values, which windowing does not restore. With windowing, "00" may mean 2000, but "00" is still less, not greater, than "99". Thus, for example, in a typical database containing YYMMDD-keyed data going back to Jan. 1, 1965 (i.e., "650101"), a sequential access starting at the logical beginning of the file would still retrieve a Jan. 1, 2000 ("000101") record as the "oldest." While windowing should cause the retrieving program to interpret "000101" as though it were actually "20000101", a sequential database retrieval would present this record in improper order or, worse, be unable to find it altogether because it did not "follow" the "991231" (Dec. 31, 1999) record. Windowing solutions for databases, therefore, require additional complex logic and consequent reprogramming to function as intended.

Complemented Dates ("9's Complement)

Date sequence poses another, related problem in the event of so-called 9's complement representations of numeric year data. Frequently it is desirable for "sequential" date presentation to be inverse. That is, the application is designed to accept the most recent datefirst, followed by the next most recent record second, and so forth, with the oldest (i.e., lowest date-indexed) record retrieved last. This has often been achieved by storing year data in 9's complement of the selected numeric data format.

Thus, a common industry practice in data processing was to subtract a date from a larger numeric value for date in key or index fields in order to reverse the sort order. Typically, Gregorian dates (YYMMDD) were subtracted from a decimal value of 999,999 or 1,000,000; Julian dates (YYDDD) from 99,999 or 100,000 to achieve this result. To preserve the sort order of dates prior to Jan. 1, 1900 as well as 9's complement dates, their binary value has to be less than the binary value for Jan. 01, 1900. A great many variations exist if all four nibbles are used. Nothing has been found in known prior art which will transparently accommodate 9's complemented date fields.

Encoding/Decoding Methods

Other solutions in the prior art, and the category into which the present invention most closely fits, are methods which utilize the year fields or year portions of date fields in their existing size and encode these with a scheme that extends their value to accommodate a larger range of years. All such methods have the advantage of not having to expand the YY fields in database (or backup or historic) records.

These techniques use non-decimal integer representations of the underlying binary bytes (or cells) effectively rendering (or "packing") four-digit years within existing two-character fields. The resulting underlying values may be in base 2 (Boolean), base 16 (hexadecimal) or some user-defined format. These solutions add complexity and, consequently, may have a negative performance impact on frequently used date routines. These may also require additional formatting to render the encoded/compressed date comprehensible on output and, moreover, may not provide much more of a date range in some circumstances than windowing techniques afford, with less complexity. Moreover, except for the present invention, these encode/ decode methods do require the conversion of all data (including backup and history records) and source programs at the same time, as does windowing, or to perform some bridging software to accomplish century recognition. The most significant disadvantage of encoding/decoding techniques, except for the present invention, is that these methods do not address the problem of proper YY sequencing in key and index fields.

N.B.: When the terms "encoding" and "decoding" are used together herein, these do not refer to inventions in the alternative. Rather, decoding becomes a requisite counterpart of the encoding process, analogous to reading something which had been written. Writing has arguably little utility if it could not be read; similarly, encoding a year datum would lack utility if it could not be subsequently decoded for interpretation.

Encoding/Decoding: 28-Year Cycle

One solution in the prior art recognizes a repetitive pattern in the yearly calendar every 28 years, and implements century recognition by subtracting 28 from the year at issue and applying certain logic thereto to ascertain the appropriate century. By subtracting 28 from the present year in YY format, the pattern of the days in a week remain unaltered. In addition to the advantage (same size year field) the 28-year cycle solution is less complex, if lacking somewhat in intuitive logic (e.g., 2000 becomes 1972, whereas 1972 itself becomes 1944, etc.), as follows:

"00" (for 1900) or X'F0F0' is not supported

"27" (for 1927) or X'F2F7' is not supported

"28" (1928 as X'F2F2') to "00" (or X'F0F0') and is the minimum permissible year.

"71" (1971 as X'F7F1') to "43" or (X'F4F3')

"72" (1972 as X'F7F2') to "44" or (X'F4F4')

"99" (1999 as X'F9F9') to "71" or (X'F7F1')

"00" (2000 as X'F0F0') to "72" or (X'F7F2')

"27" (2027 as X'F2F7') to "99" or (X'F9F9') and is the maximum permissible year.

In addition to the various disadvantages (including non-utility for key fields, universal updating or bridging, and historic data problems, non-prior century support) of other encoding/decoding methods, this method is further restricted to a 28-year range and will not work for any dates prior to 1928.

Value Range and Nibble Checking Methods

U.S. Pat. No. 5,644,762 (Soeder) discloses a method and apparatus for recording and reading date data having coexisting formats, which manipulates the entire bytes (or cells) to achieve century recognition and does not preserve the existing low-order nibbles containing the "00" through "99" datum. This not only adds a level of complexity and sophistication required of the technician implementing this method, but does not thereby preserve key/index transparency. Moreover, by manipulating an entire byte, Soeder does not address the century problem for the extensively used "packed" representations (i.e., COMP-3) numerical years. Most significantly, Soeder fails to address the crucial and pervasive problem of keys and indexes for the Year 2000.

Accordingly, neither does the Soeder method/apparatus address the problem in 9's-complemented date fields.

In Soeder, the disclosure only provides for a check of whether "at least one of the plurality of year data has a composite binary integer value which is inside or outside a range from 12,336 to 14,649, inclusive" for alphanumeric ASCII number years or "at least one of the plurality of year data has a composite binary integer value which is inside or outside a range from 61,680 to 63,993, inclusive" for alphanumeric EBCDIC Number Years. By restricting the analysis to ASCII and EBCDIC numeric years and not with years represented in the widely utilized packed format, the Soeder approach will not operate with all data formats commonly employed to represent 2-digit years nor solve the problem of Year 2000 keys and indexes.

By contrast, the present invention checks only the value of the two nibbles which represent the numbers for the year so that the first nibble has a value between "0" and "9" (or binary "0000" and "1001") and the second nibble has a value between "0" and "9" or ("0000" and "1001"), irrespective of whether it is an ASCII, EBCDIC, or packed numeric representation of a 2-digit year to determine whether the year is in the format of the present invention. This enables the present to operate effectively beyond the limitations of Soeder and with all year-data formats. The distinction of the present invention from this prior art may be more readily understood by reference to the flowchart in FIG. 1.

Binary Representation and Manipulation

Other prior art solutions rely on binary representations, including Soeder which gives an example of how to represent the year 2000. Since 2000 is greater than 1999 it cannot be represented in the traditional two-byte format using either EBCDIC or ASCII. Soeder also gives an example of how to represent the year 2096. Since 2096 is greater than 1999 it cannot be represented in the traditional two-byte format using EBCDIC or ASCII. Soeder suggests that for these cases the year should be represented as a simple binary number corresponding directly to the year itself. In the specific case of 2096, Soeder states the representation would be X'0830', B'0000 1000 0011 0000' (i.e., binary or base 2). According to the present invention, the year 2096 would simply be represented as X'FFFA' in EBCDIC (or B'1111 1111 1111 1010') or X'3F3A' in ASCII EBCDIC (or B'0011 1111 0011 1010'), or very different representations from Soeder's suggested representation of the same number.

Other prior art suggests that for these cases the Year 2000 (as "00") should be represented by converting the two-digit decimal year to:

(a) an equivalent hexadecimal number such as X'64':

"00" (1900) or X'F0F9' to X'00'

"99" (1999) or X'F9F9' to X'63' (i.e., $99_{10}$)

"00" (2000) also X'F0F0' to X'64' (i.e., $100_{10}$)

(b) a one-byte (i.e., two-digit) unsigned packed decimal format of the four-digit year:

"00" (1900) for X'F0F0' to X'1900'

"99" (1999) for X'F9F9' to X'1999'

"00" (2000) also X'F0F0' to X'2000'

(c) a simple binary number corresponding directly to the year itself (e.g., Soeder) except for $20^{th}$ century dates:

"00" (1900) for X'F0F0' remains X'F0F0'

"99" (1999) for X'F9F9' remains X'F9F9'

"00" (2000) also X'F0F0' becomes B'2000'

(d) a packed decimal equivalent with the century added in Julian date format (CCYYMMDD) with high-order zeros padded as may be required:

Jan. 1, 1900(000101) or X'F0F0F0F1F0F1' to X'00019000101D'

Jan. 1, 1999 (990101) for X'F9F9F0F1F0F1' to X'00019990101D'

Jan. 1, 2000 (also 000101) or X'F0F0F0F1F0F1' to X'00020000101D'

The present invention, in a preferred embodiment only, would represent Year 2000 as X'F9FA' (EBCDIC) or X'393A' (ASCII) binary—again, different representations of the same number from prior art methods. The difference relies on the fact that this invention makes a logical choice as to how to represent years following 1999, whereas some prior art does a simple mapping of the year to a two byte binary representation. This method is more readily understandable considered with the depiction of FIG. 1.

Arithmetic Manipulation

Some prior art must do arithmetic in an extremely careful manner since it separates years outside the range of 1900–1999 and puts them in a very different format. Depending on what numerical representation format the processing environment dictates, arithmetic operations must be done with carefully chosen offsets. The heretofore described 28-year cycle subtraction method (i.e., subtract 28 from the year rendering X'F7F2') may be considered another method of arithmetic manipulation.

In the present invention, since the year 2000 follows the year 1999 sequentially, a simple subtraction can be performed. This works regardless of environment (EBCDIC or ASCII, packed or unpacked). For example, in some prior art, subtraction of the year 1999 from the year 2000 must be done by first adding an offset to the binary representation of the year 2000 (depending on the environment) and then doing the subtraction. Deciding on which offset to use and then adding it to the year is cumbersome and slow.

In contrast, the present invention represents years sequentially regardless of their value and the environment. If the environment is EBCDIC and not packed, the X'F9FA' (representing the year 2000) minus X'F9F9' (for 1999) equals one (1). Another question is what prior art would do when the case of packed EBCDIC data arises. Packed numeric representations are extremely common and are represented in the format: nn nn nC, where 'b' represents a nibble, X'C' is the sign and the value is stored in three bytes, the minimum size to store a Julian year (e.g., P'991231' for Dec. 31, 1999). If the environment is EBCDIC and packed, the high order byte value, X'9A' (representing 2000 in the present invention) minus X'99' (for 1999) still properly equals one (1). As such, the method of the present invention is extremely fast, simple to comprehend by those skilled in the art and is unlikely to be prone to error.

Disadvantages of Prior Art Solutions

The foregoing solutions have a variety of common disadvantages. The first disadvantage is in the substantial number of staff hours required to implement them. Programming talent is at a premium and, obviously, technical personnel resources dedicated to making old code Year 2000 compliant are not simultaneously available to address present software needs. All of the foregoing Year 2000 techniques require modifications to a database and/or the schema which defines it as well as a recoding or recompilation of the programs which interpret the data therein.

The rebuilding of a database is a particularly problematic and painstaking exercise, especially where a year field is present as part of the index key. As a practical matter, two parallel databases must be created for the purpose of regression testing each module, subroutine and program affected. Parallel databases imply parallel updating, simultaneous backups and other duplicate effort for all ongoing development and maintenance.

The revision of an application program can be even more insurmountable as one of the vicissitudes of mature mainframe computing systems is missing source code. It is generally acknowledged that software development methodologies, including careful version and revision controls lagged behind the rapid advances of software development tools themselves. As a consequence, the harsh fact confronting information managers even in well run companies is missing source code, the English-like (e.g., COBOL), algebra-like (e.g., FORTRAN), hybrid (e.g., PL-1) or other mnemonic (e.g., C) expressions of the underlying algorithm. In the commercial world of large mainframe processing, IBM-developed versions of COBOL are particularly endemic and virtually impossible to decompile (i.e., a reverse engineer) from the compiled and linked executable modules.

Another disadvantage of the prior art lies in the lack of portability of various Year 2000 solutions. That is, a solution implemented on an IBM-developed product may be inutile on that of another vendor. But the overwhelming drawback to any Year 2000 solution to non-compliant older software is the substantial amount of time required to implement the solutions. Given that the present Pontiff would appear to lack Pope Gregory's inclination or ability to compel a worldwide recalibration of the western calendar, time itself is a vanishing commodity as the dawn of the New Millennium rushes forward.

SUMMARY OF THE INVENTION

The present invention provides a unique, generic method of extending the numeric range of a previously defined two-digit field in the commonly employed numeric representational formats of ASCII, EBCDIC and packed decimal without the necessity of disturbing data previously stored in such fields and, therefore, the necessity of rewriting databases and simultaneous reprogramming of the software programs which access them. As such, the present invention can address a variety of contexts where a two-digit representation must be expanded without disturbing existing data. Presently, the most urgent need for this method is as a Year 2000 software solution.

An ideal solution to the Year 2000 problem would be one which avoids the limitations of the prior art. An object of the present invention, also designated zipDate™ hereafter, is to rapidly implement an encoding scheme which utilizes unused or under used bits in the numerical representation of dates contained computer database records.

Another object is to be as format-transparent as possible (i.e., ASCII, EBCDIC, or packed decimal). A straight binary mapping of years greater than 1999 requires a minimum of three (3) nibbles (or 1½ bytes or cells); for example B'0111 1101 0000' equals 2000 in decimal. Realistically, no computer is anything but byte addressable, therefore two bytes (or cells) are the minimum amount of space required to store the binary representation of years greater than 1999.

EBCDIC, for example, would store a two digit year in two bytes in the format B'1111 bbbb 1111 bbbb' where 'b' represents a single bit. The year is extracted from this representation by translating the first 'bbbb' group into a number in the range zero to nine. Although a nibble can represent a number in the range zero to fifteen, this is not currently done since the decimal number system only utilizes digits 0–9. The second 'bbbb' group is translated in the same way. These two digits are then concatenated to obtain the year. The range of values of numbers represented in this fashion is 61,680–63,993. That is, B'1111 0000 1111 0000' equals 61,680 and B'1111 1001 1111 1001' equals 63,993. In hexadecimal (base 16, a more convenient way of expressing binary numbers) these two numbers are X'F0F0' and X'F9F9', respectively. Therefore, if the year 1999 were to be stored in non-packed, EBCDIC format it would be stored as X'F9F9'. The problem arises when the year 2000 is stored. When a two-digit EBCDIC format is used, the year 2000 can only be represented by X'F0F0', which also corresponds to the year 1900. A similar problem arises with ASCII code (which replaces the high-order hexadecimal F's with hexadecimal 3's).

Because zipDate does not check the year's numeric format per se, format is irrelevant to the invention. In zipDate, the year 2000 is represented as X'F9FA' (if the format happens to be EBCDIC) or X'393A' (if the format happens to be ASCII). Although zipDate may utilize an EBCDIC or ASCII border it does not matter which format is employed; zipDate is concerned only about those nibbles which represent the number or second and fourth nibbles for non-packed years or first and second nibbles for packed years. This is the same as the EBCDIC and ASCII formats except the high order F's and 3's, respectively, are omitted. Some prior art relies entirely on there being two bytes available for manipulation. In many cases, this is a valid assumption. In entirely too many cases, this is not a valid assumption.

Because of the uniqueness of zipDate, only two nibbles are manipulated, regardless of format (EBCDIC, ASCII or packed). Accordingly, years both less than 1900 and greater than 1999 are represented with only two nibbles (e.g., the year 2000 as X'F9FA' in EBCDIC; X'393A' in ASCII). If the environment dictates that packed be used, the year 2000 is X'9A'. ZipDate is versatile enough to assimilate into any two-byte or four-byte environments.

With some prior art, however, the year 2000 is always X'07D0'. If the environment dictates packed representations, the year becomes X'D0', which corresponds to the year 208. In fact, the largest year that can be represented by a strict binary mapping of one (8-bit) byte is 255.

Another object of the present invention is to preserve prior (i.e., 19$^{th}$) century data in packed format. As packed data always contain a sign indicator, zipDate represents years before 1900 with a negative sign. This method is more readily understandable considered with the examples depicted in FIG. 1.

Figure 5A:
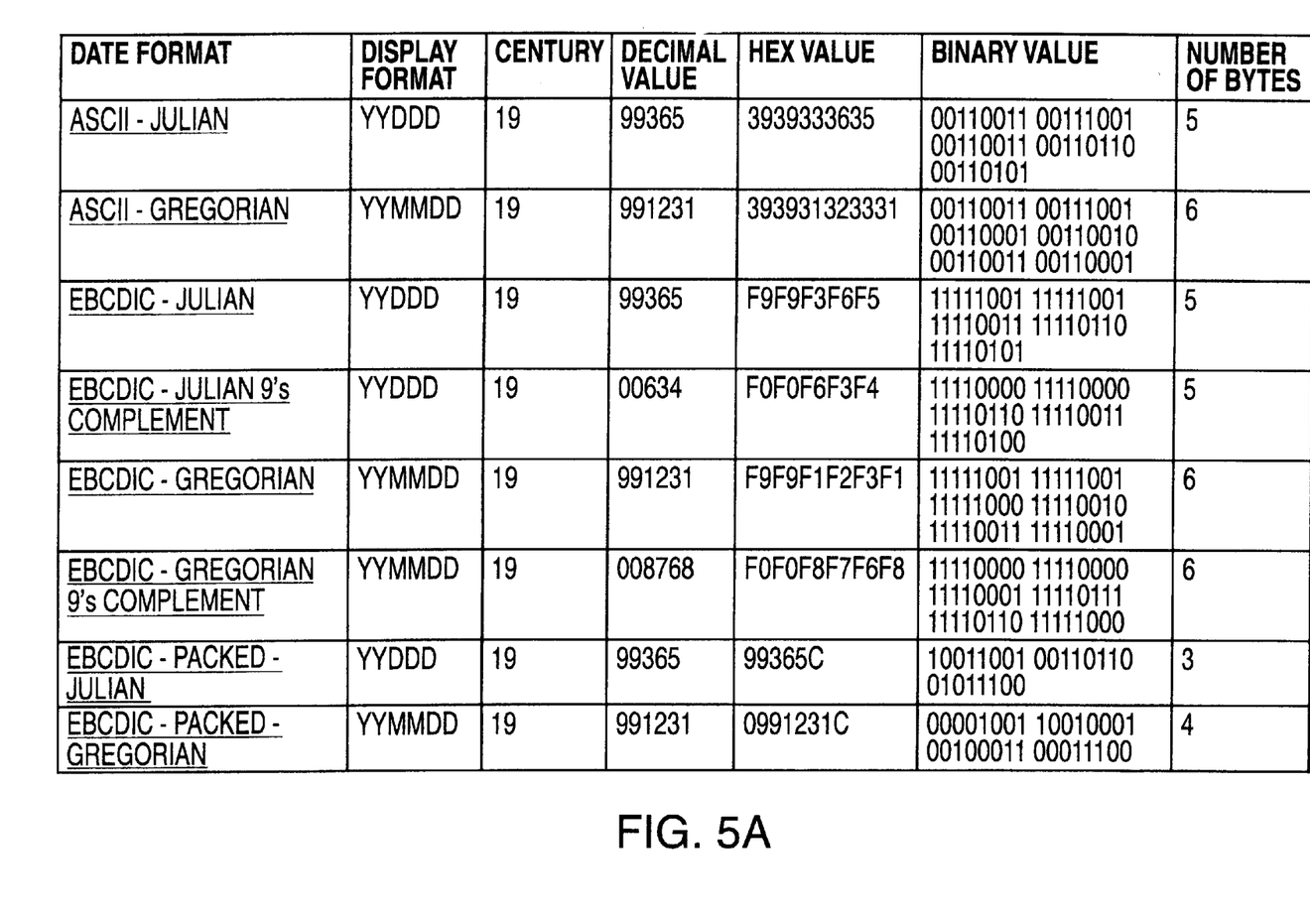
FIG. 5 depicts three tables: the first table depicts the various common ASCII and EBCDIC fixed, complemented and packed representations of the numeric values representing Dec. 31, 1999, which the present invention will leave undisturbed; the second table illustrates the method of the present invention by illustrating a future century numeric representation (Dec. 31, 2000) in these same formats; the third table further illustrates the method of the present invention by illustrating a prior century numeric representation (Dec. 31, 1899) in these same formats.
Figure 5B:
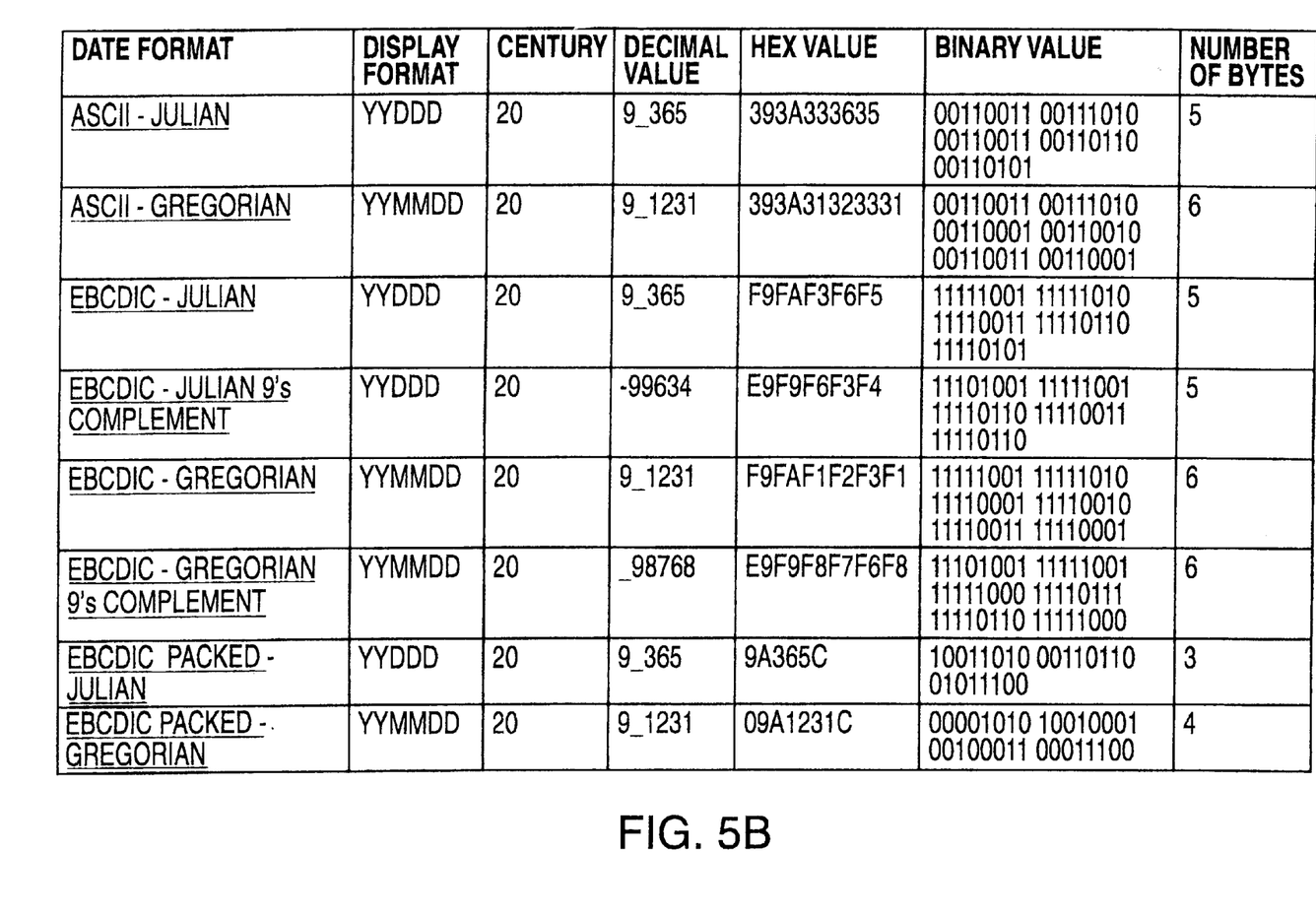
Figure 5C:
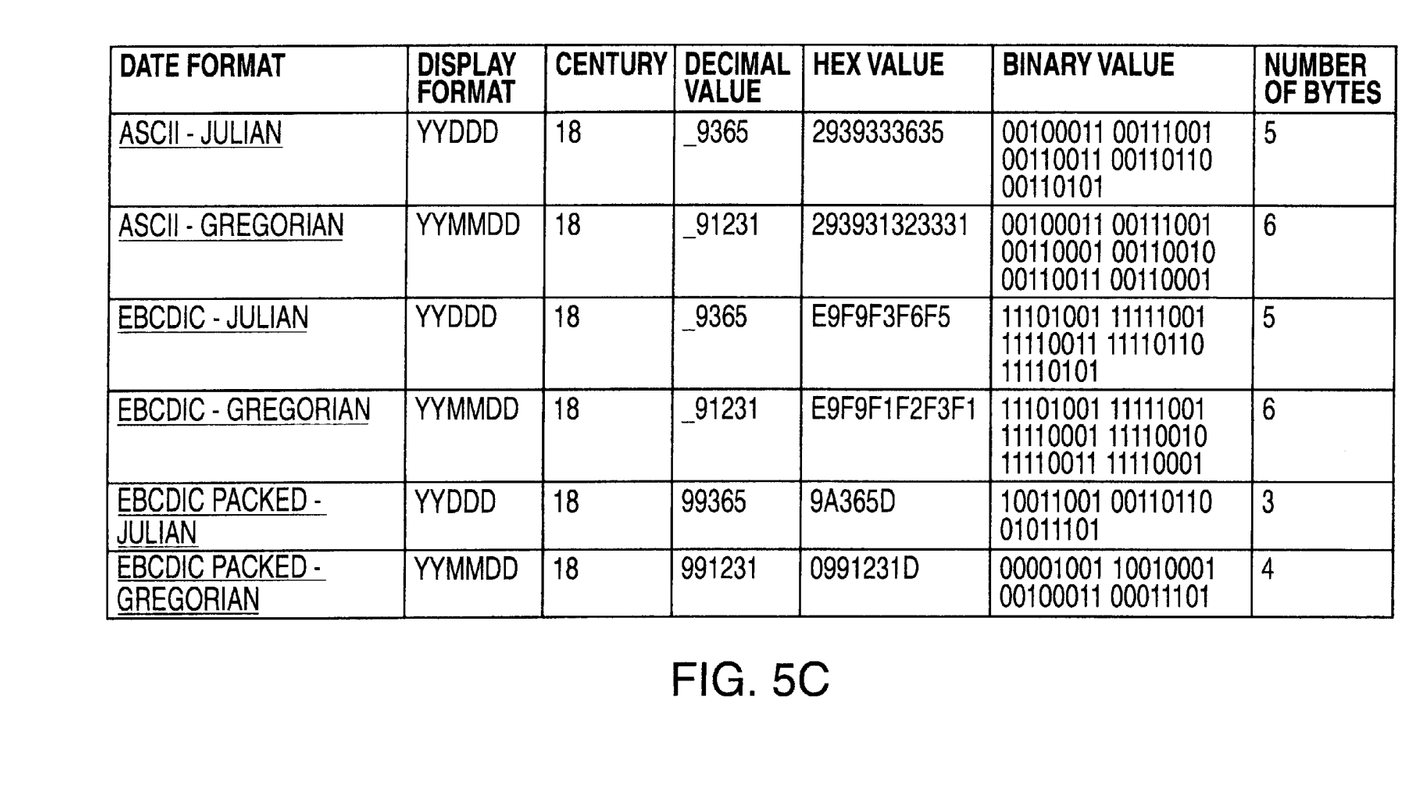

Another object of the present invention is to preserve the index or sort sequence of existing year fields or sub-fields and thereby promotes transparent operation of existing code, avoiding or minimizing the need to reprogram and test database applications. ZipDate is particularly adapted to operate transparently with database keys and indices utilizing IBM's IMS and VSAM using EBCDIC and "packed decimal" (COMP-3) integer representations used in major mainframe installations, although the invention will operate with numeric data represented in ASCII databases as well. ZipDate stores years in a numerically sequential order, such that the representation of the year 2000 is one greater than the representation of the year 1999 and the representation of the year 1899 is one less than the representation of the year 1900 (see tables in FIG. 5). Accordingly, zipDate allows databases with dates in keys or indexes and the programs that manipulate them to continue operation in the same logical fashion as they were before. Most prior art solutions, by mapping the years directly to their binary representation if they fall outside the range 1900-1999, do not solve the sorting or index problem. A database could conceivably be forced to function in this way but would involve manipulation of some very old, volatile and long code. This could, in effect, virtually recreating another year 2000-style problem since such databases are such an integral part of modem commercial computing Another object of the present invention is to preserve the ability of software to properly compare year data. This is achieved by the preservation of numerical sequence in the encoding scheme.

Another object of the invention is to accommodate the problem of dates stored in 9's complement (i.e., subtracted from an arbitrarily assigned higher value) to effectuate a reverse sort order of newest record retrieved first, oldest last. For the same reasons as for future dates, zipDate only uses two nibbles to represent the year. The two nibbles used to represent 1900 are "00" or B'00000000', which has the lowest sort-order value. So in order to change the sort order such that prior century years sort before Jan. 1, 1900, zipDate changes the high order nibble for non-packed dates to a lower binary value. For EBCDIC any value lower than X'F' or B'1111' will work such as X'E' or B'1110'. For ASCII representations, any value lower than X'3' or B'0011' will work such as X'2' or B'0010'. For packed Julian dates, there are no nibbles above the year nibble to alter the sort order for prior years before Jan. 1, 1900. Therefore, zipDate alters the low-order nibble in the packed date field (also known as the "sign byte") to change it to a negative number. If X'C' or B'1100' appears as the positive sign byte (X'C' is the preferred EBCDIC positive sign), then changing it to X'D' or B'1101' (the preferred negative sign) will render it negative.

Another object of the invention is to be implementable in most installations at the program or database level, with the database implementation being the preferred mode thereof. By implementation at the database level, or via a common database "call" or subroutine, the absence of source code can become irrelevant because the inherent function of the algorithm is preserved. At most, a new subroutine linkage (or "relink") may be required, which is substantially less effort than the recoding and retesting of all underlying source programs. A 100-year window logic is superimposed on implementations at the database level to conform to the pre-existing implied 100-year window (i.e., 1900–1999) of most existing legacy software accessing databases.

Another object of the present invention is to be particularly economic and efficacious in large scale database applications, particularly those utilizing widely implemented IBM-based (e.g., IMS and VSAM), although some program revision or rewriting may still be required for arcane purposes or idiosyncratic instances of date arithmetic. The primary problem confronting database applications is the proper sequencing of dates; i.e., preventing the year (YY) digits "00" being interpreted as 1900 instead of 2000, with the result that in software the year 2000 does not follow 1999 for chronological purposes, with unpredictable and potentially dire consequences. The present invention uses an encoding/decoding technique which is invisible to the programs which accessing such databases.

The best place from which to invoke zipDate can depend upon the particular application. Generally, correcting dates in keys and indexes in databases is the most expensive item to render software Year 2000 compliant. So the best place to call zipDate would be wherever it would fix dates in keys and indexes. Thus, calling zipDate at the database level is the best use of the zipDate by intercepting a program call to the database in question. Many database application programs can be adapted to Year 2000 with little or no source code changes using zipDate. See FIG. 3 and FIG. 4.

The next preferable implementation of zipDate is a call from the application program. For complex database structures, calling zipDate from the application program is the best choice. The option of calling zipDate from the database level is a major advancement over certain prior art and sets the present invention apart as a significantly better solution.

Another advantage of the present invention is its applicability to databases other than IBM products. A variant of the present invention is applicable to non-hexadecimal (i.e., non-IBM oriented) database systems coded in ASCII.

Another object of the present invention is to overcome the restriction in the prior art of an arbitrary 100-year window, except optionally where this may facilitate implementation. The present invention can accommodate a comfortable range of more than 1000 years in either direction, although windowing is employed in one of the embodiments of the invention to conform to the preconceived 100-year window (1900–1999) of most legacy programs which have restricted their year fields to two digits. Thus, the zipDate implementation becomes transparent to most such programs.

To preserve the sort order for dates greater than Dec. 31, 1999 the binary value has to be greater than Dec. 31, 1999. Many variations exist if all four nibbles of the year are used for non-packed dates. With the use of all four nibbles it is possible to represent 1,542 combinations in binary which sort higher than the EBCDIC representation of Dec. 31, 1999. Many more variations exist for ASCII; however, because EBCDIC is pervasively implemented and has the lower range, zipDate matches the restriction for EBCDIC. Packed dates only have two nibbles available to represent the year. This greatly reduces the number of combinations that will sort above Dec. 31, 1999 to 102. If the nibbles in the month and/or days were used, many more combinations exist. What is the best representation for years greater then 1999 can depend on the application. Because months and days do not always exist in all Year 2000-sensitive dates, the use of the nibbles that represent them are not used in zipDate. Because packed dates have only two nibbles available, and because 102 future years is adequate for the vast majority of applications, zipDate only utilizes nibbles to represent the year and thus is commensurately limited to 102 years into the future for most applications using packed year data. If an application needs to represent dates beyond 102 years into the future, zipDate could use all four nibbles and then represent dates 1,542 years into the future for non-packed dates.

The final and perhaps most important object of the present invention over the prior art is in speed of implementation because of the ever-shrinking time constraint inherent in the Year 2000 problem. ZipDate technology is simple in design and readily comprehensible by computer program analysts, software designers, database managers and others skilled in the art. As such, the present invention would relieve database managers and the entities which own and manage them the extraordinary cost of effectuating a Year 2000 solution within the constraint of time, assuming an alternative solution is implementable at all with existing resources.

BRIEF DESCRIPTION OF THE DRAWINGS

The present invention is more readily understandable by reference to the following detailed description read in pari materia with the accompanying drawings in which.

DETAILED DESCRIPTION OF THE
PREFERRED EMBODIMENT OF THE
INVENTION

The present invention utilizes unused bits in the "packed" or printable representations of integers defined (or redefined) in IBM EBCDIC, packed decimal and/or ASCII. The preferred embodiment of this invention applies the logic to such fields which have been employed for use, or contain as part of the field, a two-digit (YY) year datum with the century digits omitted, impliedly defining the low order two integers of years 1900 through 1999.

EBCDIC Future Year Data

To employ the logic of the present invention, the database programmer simply adds units of $1_{16}$ to the two digit (YY) representation of the year. Applied to the end-of-century problem, this would render the sum of 1 and X'F9F9' ("99" in EBCDIC) as X'F9FA', which zipDate understands to represent the Year 2000. Additional year increments would be represented as X'F9FB' (representing 2001), X'F9FC' (representing 2002), and so forth in an ascending sequence. When the maximum hexadecimal value of the low order byte has been reached; i.e., X'F9FF' (representing 2006), the next year would cause an increment of the low-order nibble of the high order byte, or X'FAF0' (representing 2007), and so forth through the maximum value of X'FFFF' (representing 2101). By preserving the ascending sequence, zipDate preserves the order of keys and indices transparently.

ASCII Representation of Year Data

The same encoding/decoding technique is employed for ASCII representations of integer years "00" through "99" in ASCII, except that these are recognized as X'3030' through X'3939' in ASCII (as opposed to X'F0F0' through X'F9F9' in EBCDIC), wherein the current representation of the two-digit $20^{th}$ century years (CC) does not change, but are sequenced appropriately without modification before 2000 and after 1899, respectively, in the existing two digit field. A comparison of ASCII and EBCDIC representations as interpreted by zipDate may be better illustrated by comparing the tables in FIG. 5.

Packed Decimal Future Year Data

Similarly, zipDate manipulates the low-order nibble of the high-order byte of packed decimal (i.e., COMP-3) representations of dates. For example, the Julian date of $99135_{10}$ (i.e., May 15, 1999) is represented internally as X'99135D' in three bytes. Adding 1 to the first byte renders May 14, 2000 representation as X'9A135D' (May 14, not May 15 due to the leap year 2000); May 15, 2001 as X'9B135D', May 15, 2002 as X'9C135D', and so forth through X'FF135D' representing May 15, 2101.

Prior Century Data

For prior-century dates, the method decrements the high-order nibble of the high-order byte in EBCDIC, rendering X'E9F9' for 1899 (i.e., X'F0F0' ["00"] less 1 from the lower order X'F' nibble); X'E9F8' representing 1898, X'E9F7' for 1897, . . . X'D9F8' representing the year 1798, and so forth.

In packed decimal, the corresponding decremental representation would be two-fold: a one-time increment of the low-order nibble (to invoke negativity) and an increment to the high-order byte. For example, the Julian date for May 15, 1900 (i.e., $00135_{10}$), not a leap year, is X'00135C' in a standard packed decimal representation. In the method of the present invention, by repeatedly decrementing the high-order byte and incrementing the low-order (i.e., sign) nibble once, May 15, 1899 is rendered as X'99135D' (compared to X'99135C' for the corresponding month and day in 1999); May 15, 1898 becomes X'98135D'; May 15, 1897 as X'97135D'. For the limited utility of representing prior-century years in packed decimal form, the present invention denotes the nineteenth century by the low-order X'D' nibble which does not thereafter decrement (because it is the negative sign) for years in the 1800's. Thus, May 15, 1896 is represented as X'96135D' and so forth decrementally through 1800 (the zipDate minimum in packed decimal, also a non-leap year) represented by X'00135D', with no further decrement permitted.

Encoding a Four-digit Year Greater than 1900 into a Two-digit Year Field

Figure 1:
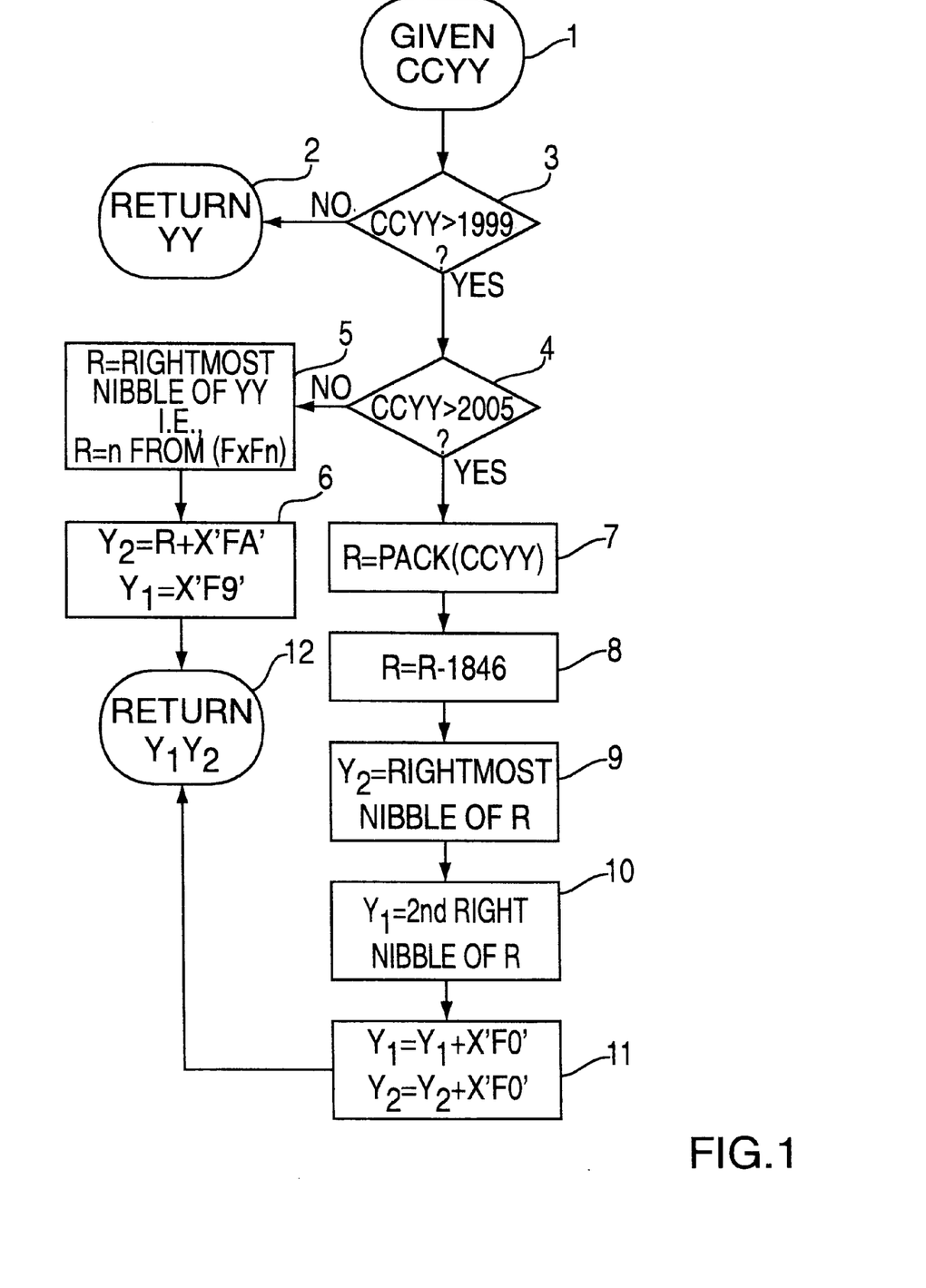
FIG. 1 depicts a logical representation in flowchart form of the process of the present invention to encode a four-digit (CCYY) year greater than 1900 into a two-digit (YY) field.

The essence of the present invention is to be able to encode a four-digit year into an existing year field restricted to two-digits (YY) without disturbing existing year data. The resultant numerical representations and patterns for ASCII, EBCDIC and packed numerical representations have been described hereinabove and illustrated by example in FIG. 5. The steps employed by the present invention to encode said four digits into two digits using EBCDIC, in accordance with the flowchart of FIG. 1, follow:

(a) From the starting point labeled #1 in FIG. 1, obtain a given CCYY (a four-digit year including century digits);

(b) The next step is to compare CCYY to the value $1999_{10}$ as depicted by decision box #3;

(c) If the comparison of the prior step determines that CCYY is not greater than 1999 (i.e., not 2000 or above), preserve YY unaltered and return as depicted in the terminal symbol #2;

(d) Otherwise, if the comparison of step (b) determines that CCYY is not greater than 2005 as depicted by decision symbol #4, then establish a two-byte variable R and set its value as follows:

i) the next step is to set variable R from the rightmost nibble of CCYY (e.g., R=n from low order EBCDIC FxFn) as shown in box #5;

ii) the next step is to set $Y_2$ equal to the sum of variable R plus X'FA' and $Y_1$ equal to the value of X'F9' as shown in box #6;

(e) Otherwise, if the comparison of decision symbol #4 determines that CCYY is greater than 2005 then:

i) the next step is to pack variable R with the value of CCYY as depicted by the process symbol #7;

ii) then subtract 1846 from R as depicted by the process symbol #7;

iii) the next step is to set $Y_2$ equal to the low-order (rightmost) nibble of variable R (e.g., R=n from low order EBCDIC X'FxFn') as depicted in process symbol #9;

iv) then set $Y_1$ from the low-order (right) nibble of the high-order (left) byte of variable R (e.g., R=x from low order EBCDIC FxFn) as depicted in symbol #10;

v) the final step is to add X'F0' (EBCDIC) to each of $Y_1$ and $Y_2$ as shown in process symbol #11;

(f) The final step is to return the resulting value of $Y_1$ and $Y_2$ as shown in the terminal symbol #12.

The preceding and following series of steps in the present invention are the same for data in ASCII format, except that the EBCDIC offset values change from X'FxFn' to X'3x3n' for ASCII.

Figure 2:
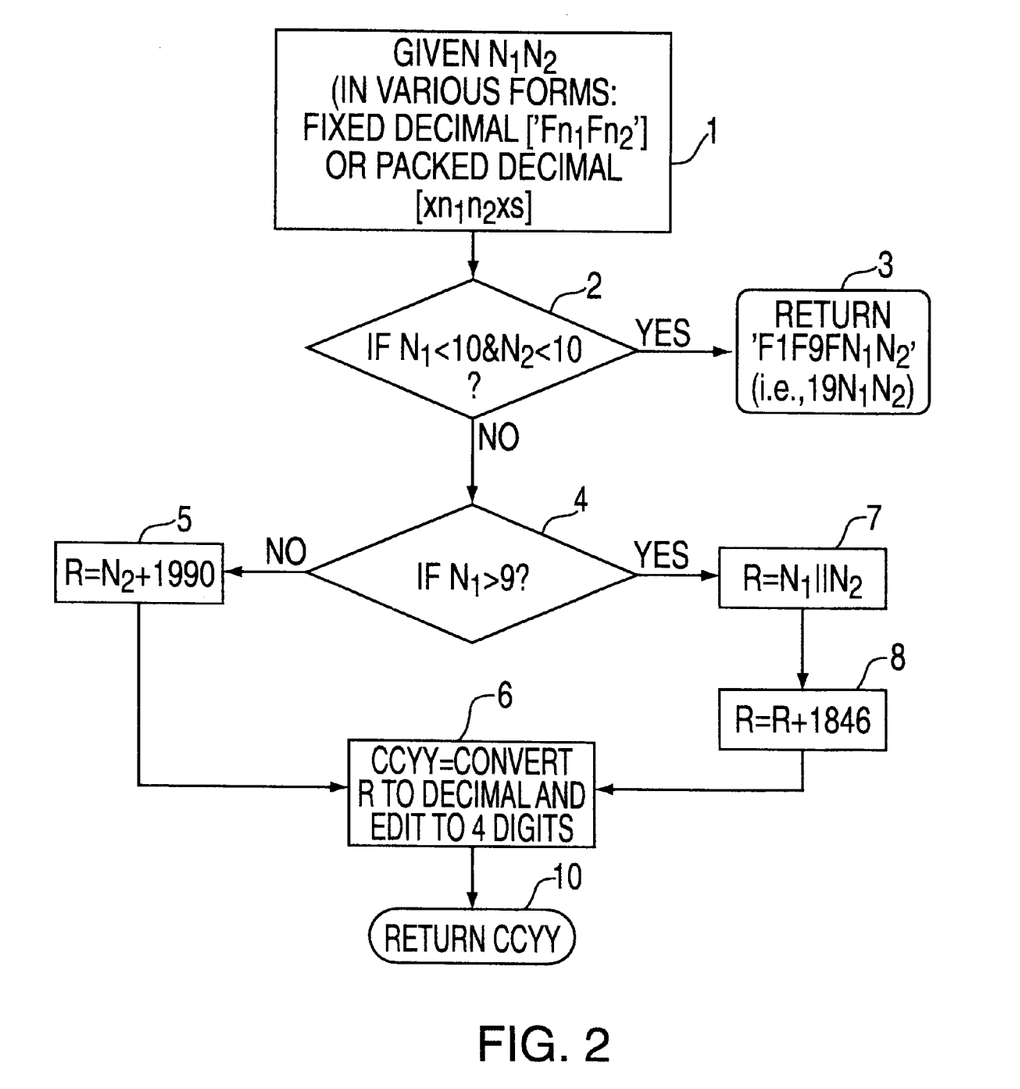
FIG. 2 depicts a logical representation in flowchart form of decoding (i.e., interpreting) a two-digit year (YY) with or without the encoding depicted in FIG. 1 as a four-digit (CCYY) representation.

Decoding a Two-digit Year (YY) Over 1900 into a Four-digit (CCYY) Year Field The decoding process depicted by FIG. 2 is the other side of the coin, giving utility to the encoding process of the present invention. Application programs must be able to decode, and thus recognize, the extended representation of data stored in zipDate format, irrespective of whether the encoding/and decoding processes take place at the database or application level. The steps employed by the present invention (in accordance with the flowchart of FIG. 1) to encode said four digits into two are:

(a) From the starting point labeled #1 in FIG. 2, obtain a given CCYY (a four-digit year including century digits) containing encoded or unencoded data representing a year, $N_1$ (decade) and $N_2$ (year 0–9 within decade) in various fixed (X'FN,$FN_2$') or packed decimal format ($xn_1$,n,xs);

(b) The next step is to compare both $N_1$ and $N_2$ to the value $10_{10}$, as shown by the decision symbol #2;

(c) If the result of the prior step determines that $N_1$ and $N_2$ are each less than $10_{10}$, the next step is to set CCYY to "19"

concatenated with $N_1$ and $N_2$ because the value represents a $20^{th}$ century year (e.g., for EBCDIC set CCYY to X'F1F9FN,FN$_2$'), and then return with thus set as depicted in terminal symbol #3;

(d) Otherwise, the next step is to compare $N_1$ to $9_{10}$, as shown by the decision symbol #4;

(e) If the result of the comparison of the preceding step is that $N_1$ is greater than $9_{10}$, (i) set R equal to the concatenation of $N_1$ and $N_2$ (i.e., $N_1 \| N_2$); as depicted in process symbol #7;

(ii) then add $1846_{10}$, to the resulting value of R as depicted in process symbol #8;

(f) Otherwise if the result of the comparison of preceding step (d) depicted by the decision symbol #4 is that $N_1$ is not greater than $9_{10}$, then set R equal to the sum of $N_2$ plus $1990_{10}$, as depicted in process symbol #5;

(g) The next step is to convert the value of R, as computed by any of the prior steps (b) through (f), to a decimal value, editing to a four-digit mask (CCYY), as depicted in process symbol #6;

(h) The final step is to return with the value CCYY as edited in the preceding step as shown by the terminal symbol #10.

The preceding steps are employed for values less than 1900 with appropriate adjustment.

Database-Level Implementation

Figure 3:
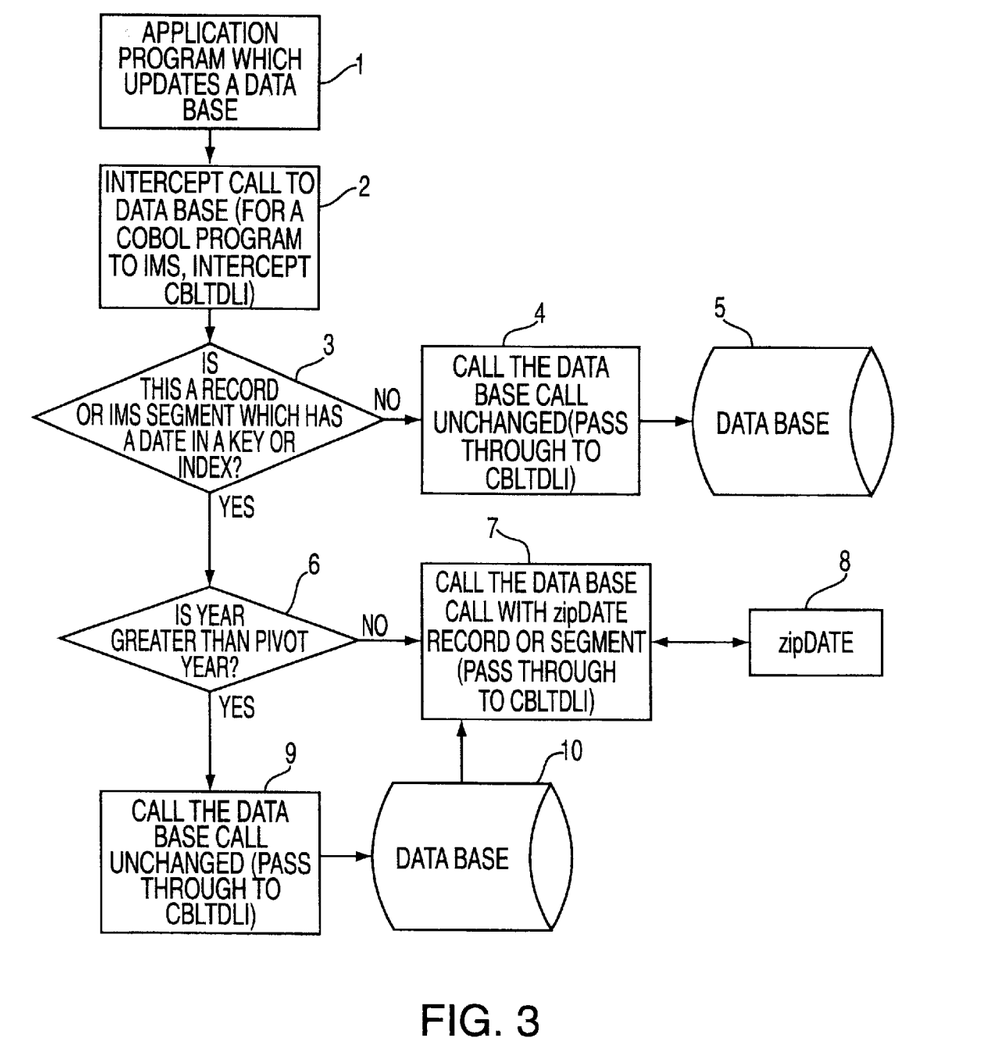
FIG. 3 depicts in flowchart form the preferred embodiment of the present invention where the implementation is made by intercepting the software application's call to the subroutine which manages access to the database requesting an update (i.e., write) of a record or segment stored in that database, and the process of encoding any two-digit year (YY) data present in key or index fields of the record or segment. In this depiction, the invention encodes a four-digit (CCYY) year into a two-digit (YY) field at the "database level" using a "pivot year" to effectuate a "windowing" technique, but one which will preserve the intended numerical sequence of years as though YY had been defined as CCYY.
Figure 4:
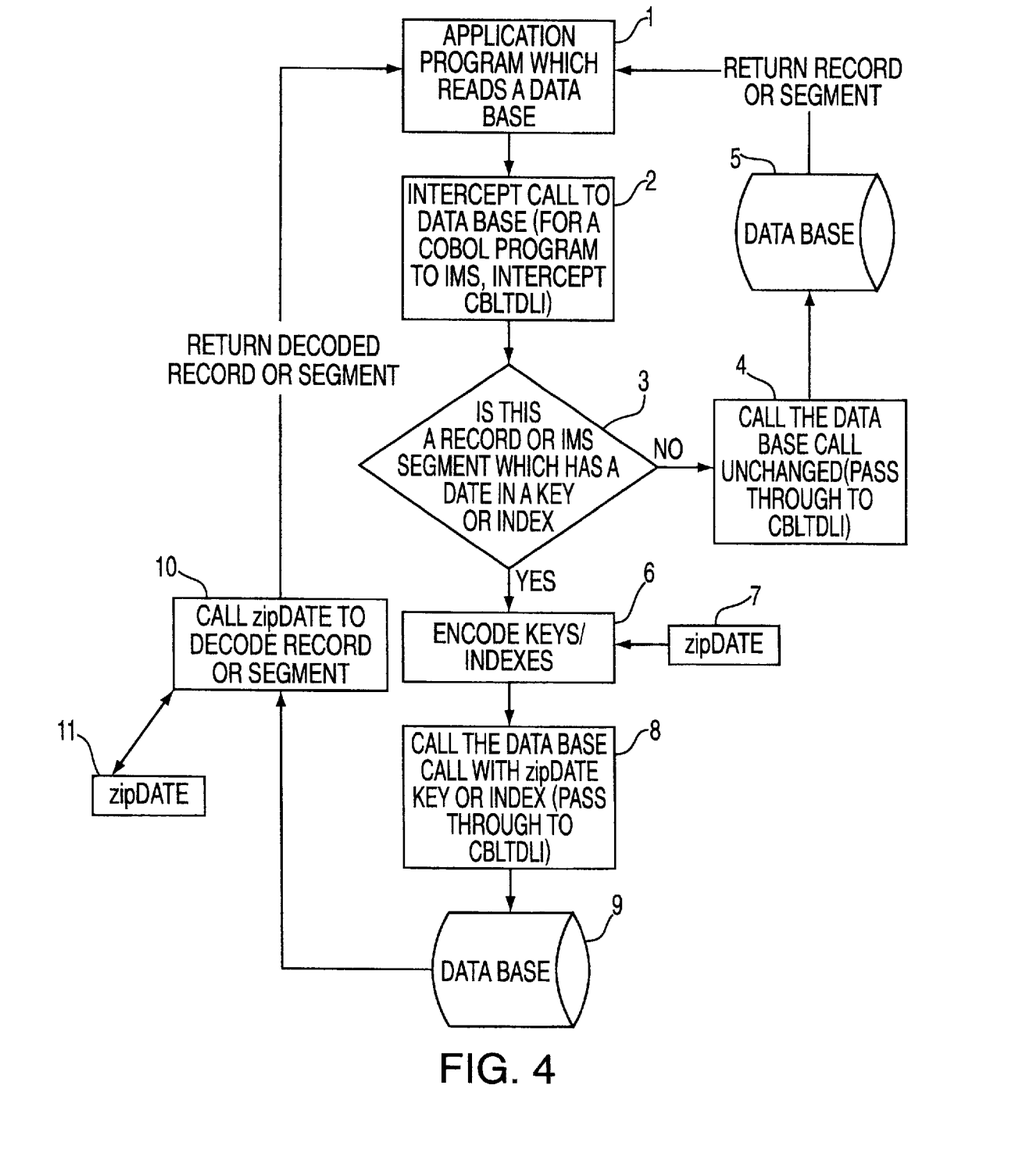
FIG. 4 depicts a logical representation in flowchart form the reverse process of the preferred embodiment of FIG. 3, intercepting a call to the database access routine requesting a read of a record or segment, and the decoding (i.e., interpreting) any two-digit year (YY) data in key or index fields with or without the encoding depicted in FIG. 3 as a four-digit (CCYY) representation.

The preferred method of invoking the method of the present invention employs zipDate logic in an interception to any program call to a common routine(s) or subroutine(s) controlling access to a database, or more colloquially, at the "database level" (as opposed to the program level) according to the method depicted in FIG. 3 and FIG. 4.

To make zipDate transparent to programs accessing the database containing two-digit (YY) year format(s) without necessarily having to be rewritten, zipDate employs a windowing technique, but without the drawback of the prior art which did not preserve the desired key sequence. The present invention is adaptable to a fixed or sliding window as may be beneficial to the particular installation thereof. Thus, to implement zipDate in the preferred method at the database-handling routine or "call" (i.e., at the "database level"), a "pivot year" must be elected as an installation option. Years greater than to the pivot year will be construed as $20^{th}$ century dates; years less than as $21^{st}$ century dates. Once the pivot year has been established, the encoding and decoding processes of zipDate can operate at the database level.

The encoding steps employed by the present invention (in accordance with the flowchart of FIG. 3) at the database level are:

(a) From the starting point labeled #1 in FIG. 3, for a given software application call to an appropriate common database-access routine or subroutine to update a database (represented by storage symbols #5 and #10) with two-digit (YY) year data;

(b) The next step is for zipDate to intercept the call to said routine or subroutine (e.g., CBLTDLI for a call to an IMS database from a COBOL program) as depicted in process symbol #2;

(c) The following step is to examine the record or segment to ascertain whether it has a date in a key or index field as depicted in decision symbol #3;

(d) If the comparison of the preceding step determines that no date in a key or index is involved, (i) the next step is for zipDate to call the intercepted routine with the record or segment unaltered, as depicted in process symbol #4; and (ii) then pass the record or segment to the database depicted in #5;

(e) Otherwise, if the examination of preceding step (d), depicted by decision symbol #3, ascertains that the record or segment contains a date in a key or index, then (f) The next step is to further examine the record or segment to ascertain whether the year of the date in the record or segment is greater than the pivot year, according to the depiction of the decision symbol #6;

(i) the next step is for zipDate to call the intercepted routine with the record or segment unaltered, as depicted in process symbol #9; and (ii) then pass the record or segment to the database depicted in #10;

(e) Otherwise, if the examination of preceding step (f), depicted by decision symbol #6, ascertains that year of the date in the record or segment is not greater than the pivot year, then (i) the next step, depicted by the process symbol #7, is to invoke the logic of the present invention (zipDate in process symbol #8) to encode the year of the date in the record or segment as determined by zipDate; and (ii) then pass the record or segment, as modified, to the intercepted routine (process symbol #7) for update to the database depicted in #10.

The result is a properly sequenced database without disturbing the "00" through "99" year data in existing year fields (or of backup or historic records of the database) when new records are added for Years 2000 and later (or 1899 and prior).

The decoding steps employed by the present invention (in accordance with the flowchart of FIG. 4) at the database level are:

(a) From the starting point labeled #1 in FIG. 4, for a given software application call to an appropriate common database-access routine or subroutine to retrieve (i.e., read) a record or segment from a database (represented by storage symbols #5 and #9) containing two-digit (YY) year data;

(b) The next step is for zipDate to intercept the call to said routine or subroutine (e.g., CBLTDLI for a call to an IMS database from a COBOL program) as depicted in process symbol #2;

(c) The following step is to examine the record or segment to ascertain whether it has a date in a key or index field as depicted in decision symbol #3;

(d) If the comparison of the preceding step determines that no date in a key or index is involved, (i) the next step is for zipDate to call the intercepted routine with the record or segment unaltered, as depicted in process symbol #4; and (ii) then pass the unaltered record or segment retrieved from the database depicted in #5 to the software application program (depicted in symbol #1) which initially called the intercepted database-access routine or subroutine;

(e) Otherwise, if the examination of preceding step (d), depicted by decision symbol #3, ascertains that the record or segment does contain a year in a date in a key or index field, then (i) the next step, depicted by the process symbol #6, is to invoke the logic of the present invention (zipDate in process symbol #7) to using the above-described representational methods to encode the keys or indices in the record or segment with the value as determined by zipDate (symbol #7); and (ii) the next step, depicted in process symbol #8, is to pass the key or index date, as encoded by zipDate, to the intercepted database-access routine or subroutine (process symbol #8) for retrieval of the appropriate record or segment to the database depicted in storage symbol #9;

(iii) then, upon retrieval of the record or segment with the encoded key by the database-access routine, the next step as shown in process symbol #10 is to invoke the logic of the present invention (zipDate depicted in process symbol #11) to decode the encoded year in the date in a key or index field according to the same method of encoding employed therefor; and (iv) the final step is to pass the record or segment retrieved from the database, as modified in the process depicted by process symbol #10 to the software application program which initially called the intercepted database-access routine or subroutine (in the process depicted by symbol #1).

These encoding and decoding results are the same for implementations of IBM (e.g., IMS and VSAM) as well as non-IBM database management products.

Accordingly, zipDate avoids the undesirable result of an unmodified Year field, with "00" being construed by the software as 1900 instead of 2000 (according to FIG. 1) without resort to altering existing year data or the need to expand and rewrite databases and their accessing programs.

In an alternative embodiment of the present invention, the zipDate process may be incorporated into the application programs themselves, according to the flowcharts of FIG. 1 and FIG. 2, wherein the encoding and decoding of two-digit (YY) years in date fields of key and/or index items are not handled through the database call routine (CBLTDLI in the above example). The interpretation of the encoded field is then handled by the application program itself. While the encoding technique is identical, this embodiment implies the availability of the source (e.g., COBOL) code and the recompilation and relinkage of all programs accessing the database. Program-level implementation also implies adoption of "windowing" logic different from the pre-existing assumption of the 100-year window of 1900–1999. Program-level implementation, however, may be less complex, facilitate use of the invention by the same program over multiple, identically defined (or redefined) databases, and may be more readily implemented by technicians of lesser skill (i.e., conventional programmers as opposed to database programmers).

While the preferred and alternate embodiments of the invention have been depicted herein in detail, modifications and adaptations may be made thereto, without departing from the spirit and scope of the invention as delineated in the following claims:

The invention claimed is:

1. A method of encoding and decoding a greater or lesser value than a previously defined maximum or minimum value of a field of a record or segment in a digital storage device with an operating system, addressable memory and executable software, said method comprising the steps of:

(a) providing a least one binary storage cell which is able to represent integer values in a portion of each cell on said digital storage device;
   (b) activating said encoding and decoding method;
   (c) connecting said digital storage device to the means for activating said encoding and decoding method;
   (d) providing an input means which a human or computer source can utilize to provide a value for said encoding and decoding method;
   (e) providing a selection means to associate said value to a desired field;
   (f) determining whether said value requires encoding and decoding;
   (g) encoding and decoding said value as required;
   (h) storing and retrieving said value; and
   wherein said value will be cognizable within the established size and format defined for said field in a computer software program utilizing said field;
   wherein said computer software program can accurately interpret unencoded values stored in said field without having to alter same;
   wherein said encoded values beyond the limitations defined for said field will be accessible in appropriate sequence with non-encoded values to said computer software program;
   wherein the unused high-order and/or low-order halves of a computer storage cell (i.e., high- and/or low-order nibbles of a byte) or of logically adjacent or concatenated cells are utilized to preserve the intended sequencing of a numerical scheme to extend the defined maximum and/or minimum without disturbing previously stored values or altering the defined format or size of said cell or cells.

2. A method of encoding and decoding as in claim 1, wherein previously stored values representing "00" through "99" fields retain the intended inference of 1900 through 1999, respectively, but wherein new records placed in said format will be cognizable as denoting years in other centuries.

3. A method of encoding and decoding as in claim 1, wherein the step of activating is performed in a common subroutine called by a plurality of said computer software programs.

4. A method of encoding and decoding according to claim 3, wherein said subroutine is devoted to control input and output access to a database.

5. A method of encoding and decoding according to claim 4, wherein said subroutine is specifically adapted to control input and output access to a database implemented rising IBM IMS technology.

6. A method of encoding and decoding as in claim 1, wherein the value of said field is represented in EBCDIC format.

7. A method of encoding and decodings in claim 1, wherein the said field is represented in packed decimal format.

8. A method of encoding and decoding as in claim 1, wherein said computer software program is specifically adapted to interpret database fields implemented using IBM IMS technology.

9. A method of encoding and decoding as in claim 1, wherein the value of said field is represented in ASCII format.

10. A method of encoding and decoding a greater or lesser value than a previously defined maximum or minimum value of a field in a record or segment in a digital storage device with an operating system, addressable memory and executable software, comprising:

(a) providing at least one binary storage cell which is able to represent integer values in a portion of each cell on said digital storage device;
   (b) activating said encoding and decoding method;

(c) connecting said digital storage device to the means for activating said encoding and decoding method;

(d) providing an input means which a human or computer source can utilize to provide a value for said encoding and decoding method;

(e) providing a selection means to associate said value to a desired field;

(f) determining whether said value requires encoding and decoding;

(g) encoding and decoding said value as required;

(h) storing and retrieving said value;

(i) preserving the numerical sequencing of said records or segments keyed or indexed by said numeric value;

(j) preserving the defined size of each cell containing said value;

(k) preserving the defined format, at least one of EBCDIC, ASCII and packed decimal, of each cell containing said value;

(l) providing an option to initiate the method at the level of a software application program or the database accessed thereby;

wherein previously said values previously stored retain their intended inference and new records placed in said format will be cognizable as denoting extended values.

11. A method of interception of a software application call to a routine or subroutine controlling access to a record or segment of a record in a database stored on a digital storage device with an operating system, addressable memory, database management key-and-index control, and executable software, comprising:

(a) providing at least one binary storage cell which is able to represent values in a portion of each cell on said database;

(b) providing said cell is able to represent values used to determine the logical sequence of said records or segments on said database;

(c) providing a software application calling for said records or segments from said database;

(d) activating said interception method;

(e) connecting said database to the means for interception method;

(f) providing an input means which a human or computer source can utilize to provide a key or index value for said record or segment;

(g) providing a selection means to associate said value to a desired record or segment;

(h) determining whether said value requires encoding and decoding;

(i) encoding and decoding said value as required;

(h) storing and retrieving said record or segment; and wherein said sequence will be cognizable within the established order defined for said record or segment in said database by said application software program utilizing said key or index.

12. A series of steps to perform the of encoding and decoding a greater or lesser value than a previously defined maximum or minimum value of a field of a digital storage device with an operating system, addressable memory and executable software, said steps comprising:

(a) encoding a given a four-digit numeric variable $CCY_1Y_2$ into a two-byte value as
　(i) comparing $CCY_1Y_2$ to a threshold;
　(ii) preserving the value of $CCY_1Y_2$ if less than said threshold;
　(iii) otherwise, further comparing to a second threshold;
　(iv) establishing a two-byte variable;
　(v) if step (iii) determines that $CCY_1Y_2$ is not greater than said second threshold, setting said variable from the rightmost nibble of $CCY_1Y_2$ then setting $Y_2$ equal to the sum of said variable plus X'nA', where n is the fixed-point nibble prefix in EBCDIC or ASCII and setting $Y_1$ equal to the value of X'n9';
　(v) if step (iii) determines that $CCY_1Y_2$ is greater than said second threshold, packing said variable from $CCY_1Y_2$ then subtracting a fixed value from said variable, then setting $Y_2$ equal to the low-order nibble of said and $Y_1$ from the low-order nibble of the high-order byte of said variable and adding X'n0' to each of $Y_1$ and $Y_2$;

(b) decoding a given two-digit numeric value $N_1N_2$ into a four byte value as:
　(i) comparing each of $N_1N_2$ to a third threshold;
　(ii) establishing a two-digit numeric literal;
　(iii) if step (i) determines that $N_1$ and $N_2$ are each less than said third threshold, setting $CCY_1Y_2$ equal to said numeric literal concatenated with $N_1$ and $N_2$;
　(iv) otherwise if step (i) determines that $N_1$ is greater than said third threshold minus one, then setting said variable equal to the concatenation of $N_1$ and $N_2$ and adding the value of a second numeric literal;
　(v) otherwise if step (iv) determines that $N_1$ is not greater than said third threshold minus one, then setting said variable equal to the sum of $N_2$ and a third numeric literal;
　(vi) converting said variable to a four-digit decimal value (vii) setting $CCY_1Y_2$ equal said variable and editing as necessary.

13. A series of operational steps to be performed on or with the aid of a computer, said steps comprising:

(a) reading a year datum comprising at least first and second nibbles from a computer-readable storage medium, the year datum representing a year;

(b) examining the read nibbles to determine whether each read nibble comprises a binary representation of a digit from 0 to 9;

(c) if both the first and second read nibbles comprise a binary representation of a digit from 0 to 9, determining the year from the year datum in accordance with the binary representations in the decimal system when said year is in the 1900s;

(d) if either the first or second read nibble does not comprise a binary representation of a digit from 0 to 9, determining the year datum in accordance with their being representations in a hexadecimal system when said year is in the 2000s, wherein sequencing order for years are preserved.

14. The method of claim 13, wherein said first and second nibbles are in different bytes.

15. The method of claim 13, wherein said first and second nibbles are in the same bits in a packed decimal system.

16. The method of claim 13, wherein previously stored values representing "00" through "99" fields retain the inference of 1900 through 1999 respectively and wherein new records placed in said format will be cognizable as denoting years in other centuries.

17. The method of claim 16, wherein said fields are represented in EBCDIC format.

18. The method of claim 16, wherein said fields are represented in packed decimal format.

19. The method of claim 16, wherein the value of said field is represented in ASCII format.

20. A series of operational steps to be performed on or with the aid of a computer, said steps comprising:
   (a) reading a year datum compressing at least first and second nibbles from a computer-readable storage medium, the year datum representing a year;
   (b) examining the read nibbles to determine whether each of the read nibbles comprises a binary representation of a digit from 0 to 9;
   (c) if both the first and second read nibbles comprise a binary representation of a digit from 0 to 9, determining the year from the year datum in accordance with the binary representations in a decimal system when said year is in the 1900s;
   (d) if either of the first or second read nibbles does not comprise a binary representation of a digit from 0 to 9, determining the year by a hexadecimal system when said year is in the 2000s, said determining step including the step of concatenating the first and second read nibbles and adding a constant to the decimal number represented by such concatenated nibbles for at least some of the binary representations, said constant making said year greater than 1999 or less than 1900.

21. The method of claim 20, wherein said concatenating step preserves the sequencing order for years in the 1900s.

22. The method of claim 21, further comprising the step of changing the binary representation using a scheme that preserves the sequencing order for years of the 1900s.

* * * * *